United States Patent
McLaughlin et al.

(10) Patent No.: US 6,644,707 B2
(45) Date of Patent: Nov. 11, 2003

(54) DECKLID AND LUGGAGE COMPARTMENT SYSTEM FOR AUTOMOTIVE VEHICLE

(75) Inventors: Ian McLaughlin, Laguna Beach, CA (US); Marek Reichman, Southam (GB); Chris Wheeler, Newport Beach, CA (US); David Woodhouse, Bromsgrove (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,313

(22) Filed: Jan. 8, 2003

(65) Prior Publication Data

US 2003/0127874 A1 Jul. 10, 2003

Related U.S. Application Data

(60) Provisional application No. 60/345,759, filed on Jan. 8, 2002.

(51) Int. Cl.[7] .................................................. B60P 9/00
(52) U.S. Cl. .................... 296/26.09; 296/76; 296/56; 296/146.8; 362/496; 224/488; 224/495; 224/311
(58) Field of Search ............... 296/26.09, 37.1, 296/37.16, 57.1, 76, 56, 146.8; 362/496, 487; 224/488, 489, 495, 309, 311, 317, 328

(56) References Cited

U.S. PATENT DOCUMENTS

| | | | | | |
|---|---|---|---|---|---|
| 1,629,403 | A | * | 5/1927 | Marwahn | 296/26.09 |
| 2,084,069 | A | | 6/1937 | Westrope | |
| 2,097,911 | A | * | 11/1937 | Becker | 296/26.08 |
| 2,172,405 | A | * | 9/1939 | Powell | 296/26.09 |
| 2,284,419 | A | * | 5/1942 | Greig | 296/26.09 |
| 2,301,963 | A | | 11/1942 | Marple et al. | |
| 2,490,014 | A | * | 12/1949 | De V. Brand | 296/26.09 |
| 2,788,137 | A | * | 4/1957 | Harkness | 296/26.09 |
| 2,795,363 | A | * | 6/1957 | Turner | 296/37.1 |
| 3,233,936 | A | * | 2/1966 | Jakosky | 296/76 |
| 3,434,239 | A | | 3/1969 | Schwenker | |
| 3,726,422 | A | * | 4/1973 | Zelin | 296/26.09 |
| 4,226,489 | A | | 10/1980 | Haag | |
| 4,799,730 | A | * | 1/1989 | Harasaki | 296/76 |
| 5,564,767 | A | * | 10/1996 | Strepek | 296/26.09 |
| 5,692,792 | A | | 12/1997 | Klar (minor) | |
| 6,131,341 | A | | 10/2000 | Wade et al. | |
| 6,186,575 | B1 | | 2/2001 | Fisher et al. | |
| 6,250,707 | B1 | | 6/2001 | Dintner et al. | |
| 6,283,530 | B1 | | 9/2001 | Hollerback | |
| 6,322,123 | B1 | | 11/2001 | Garrison et al. | |
| 6,325,445 | B1 | | 12/2001 | Schenk | |
| 6,474,715 | B2 | * | 11/2002 | Fukushima et al. | 296/37.1 |
| 2001/0022450 | A1 | * | 9/2001 | Delavalle et al. | 296/37.1 |
| 2002/0105201 | A1 | * | 8/2002 | Melotik et al. | 296/26.09 |

* cited by examiner

Primary Examiner—Stephen T. Gordon
Assistant Examiner—Lori L Coletta
(74) Attorney, Agent, or Firm—Gigette M. Bejin

(57) ABSTRACT

A decklid and luggage compartment system for an automotive vehicle includes a luggage compartment located at one end of a vehicle and a decklid for closing the luggage compartment. A linked hinge moves the decklid translationally from a closed position to a raised position and axially displaced open position. The decklid maintains a common attitude in both the closed and opened positions. A combination load floor and bumper assembly having a load floor for the luggage compartment is mounted upon a sliding carrier for movement between an extended position and a retracted position.

18 Claims, 4 Drawing Sheets

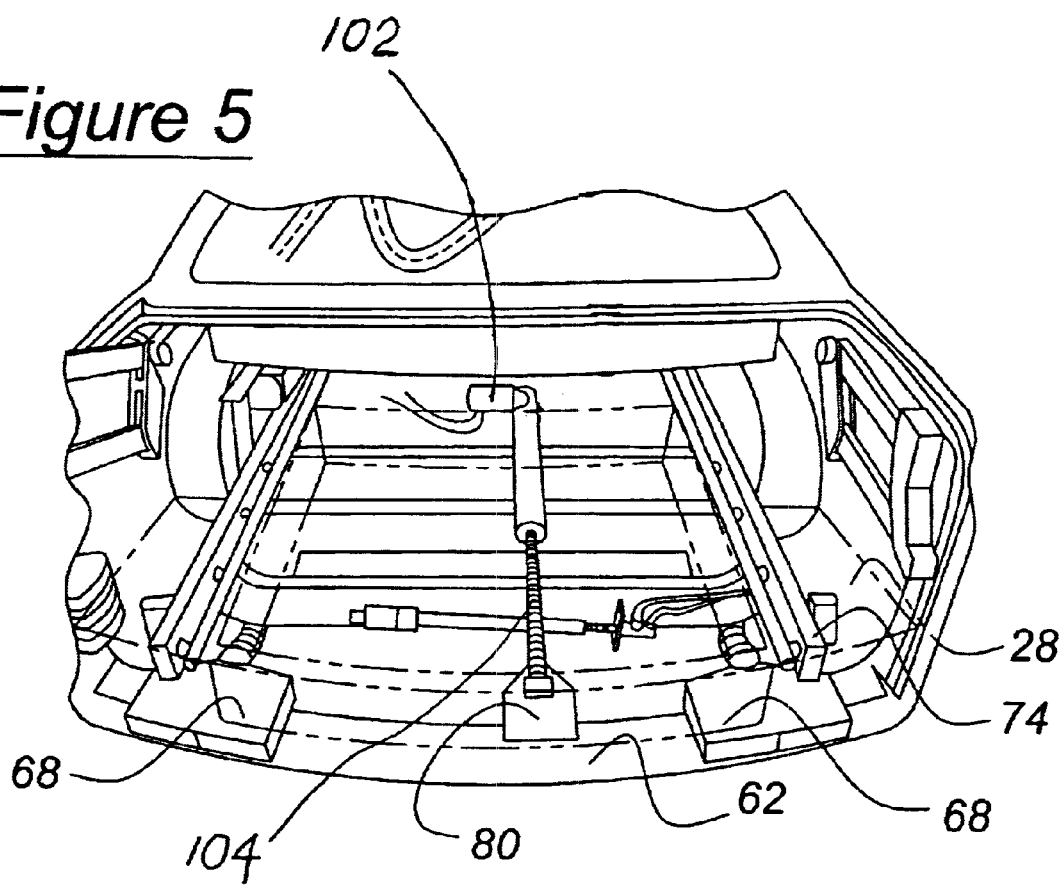

DECKLID AND LUGGAGE COMPARTMENT SYSTEM FOR AUTOMOTIVE VEHICLE

This Application claims the benefit of U.S. Provisional Application No. 60/345,759, filed on Jan. 8, 2002.

BACKGROUND OF INVENTION

1. Field of the Invention

The present invention relates to a motor driven decklid and motor driven movable load floor for an automotive vehicle.

2. Disclosure Information

Motorists commonly agree that loading and unloading of a luggage compartment (e.g., trunk) of an automotive vehicle is facilitated by the ability to place heavy articles directly on the compartment's load floor without the necessity of stooping because of an interfering decklid and lower back panel. U,S, Pat. No. 6,186,575 discloses a telescoping cargo floor which may be extended onto an the unfolded tailgate of a pickup truck. The cargo arrangement of the '575 patent does not, however, include a decklid. U.S. Pat. No. 5,692,792 discloses a pull-out load floor use in combination with a tailgate of a station wagon. A problem with the device of the '792 patent is that the load floor's width is restricted by the need to incorporate taillights in the quarter panels of the vehicle.

A decklid and luggage compartment system according to the present invention provides a full, wide, movable unrestricted, and easily loaded trunk floor, coupled with the capability of maintaining a proper display of taillights integrated into the decklid of a vehicle. Thus, passengers may load and unload items while the taillights remain visible even when the decklid is in the fully open position, the closed position, or any intermediate position.

SUMMARY OF INVENTION

A decklid and luggage compartment system for an automotive vehicle includes a luggage compartment located at one end of an automotive vehicle and a decklid for closing the luggage compartment. A linked hinge moves the decklid translationally from a closed position to an opened position so that the decklid has a common attitude in both the closed and opened positions. A movable floor is mounted upon a sliding carrier for movement between an extended position and a retracted position.

According to another aspect of the present invention, the present decklid further comprises at least one tail light, with the tail light beam mounted to the decklid.

According to another aspect of the present invention, a movable load floor further comprises a bumper having a laterally extended bumper beam and a fascia which extends both laterally and axially around the portion of the load floor. The bumper further comprises a latch system for selectively connecting the bumper beam with left and right quarter panel structures of the vehicle. As used herein, the term "bumper" means a protection system mounted at one end of the vehicle, and intended to interact with other vehicles and with stationary objects which the vehicle may encounter at an end portion of the vehicle.

According to another aspect of the present invention, the present decklid and luggage compartment system includes a motor drive operating the linked hinge of the decklid, and a second motor drive for operating the movable load floor.

According to yet another aspect of the present invention, a method for loading a luggage compartment of an automotive vehicle includes the steps of translationally opening a decklid such that the attitude of the decklid remains relatively constant as the decklid is moved from a closed position to an opened position, so as to preserve the visual orientation of a plurality of taillights attached to the decklid, and opening a combination bumper and luggage compartment load floor, by moving the combination load floor axially from a retracted position to an extended position. After luggage items have been placed upon the extended load floor, the combination load floor will be moved to its retracted position, and the decklid will be closed translationally such that the visual orientation of the taillights is preserved during and after closure of the decklid.

According to a final step of the present method, the combination bumper will be latched to adjoining body structures when the bumper is returned to its retracted position.

Other advantages, as well as objects and features of the present invention, will become apparent to the reader of this specification.

BRIEF DESCRIPTION OF DRAWINGS

FIG. 5 is similar to FIG. 3 being a rear view of the vehicle having a decklid and luggage compartment system according to the present invention, but showing an electrically motor powered actuator for motorizing load floor 28.

DETAILED DESCRIPTION

Figure 1:
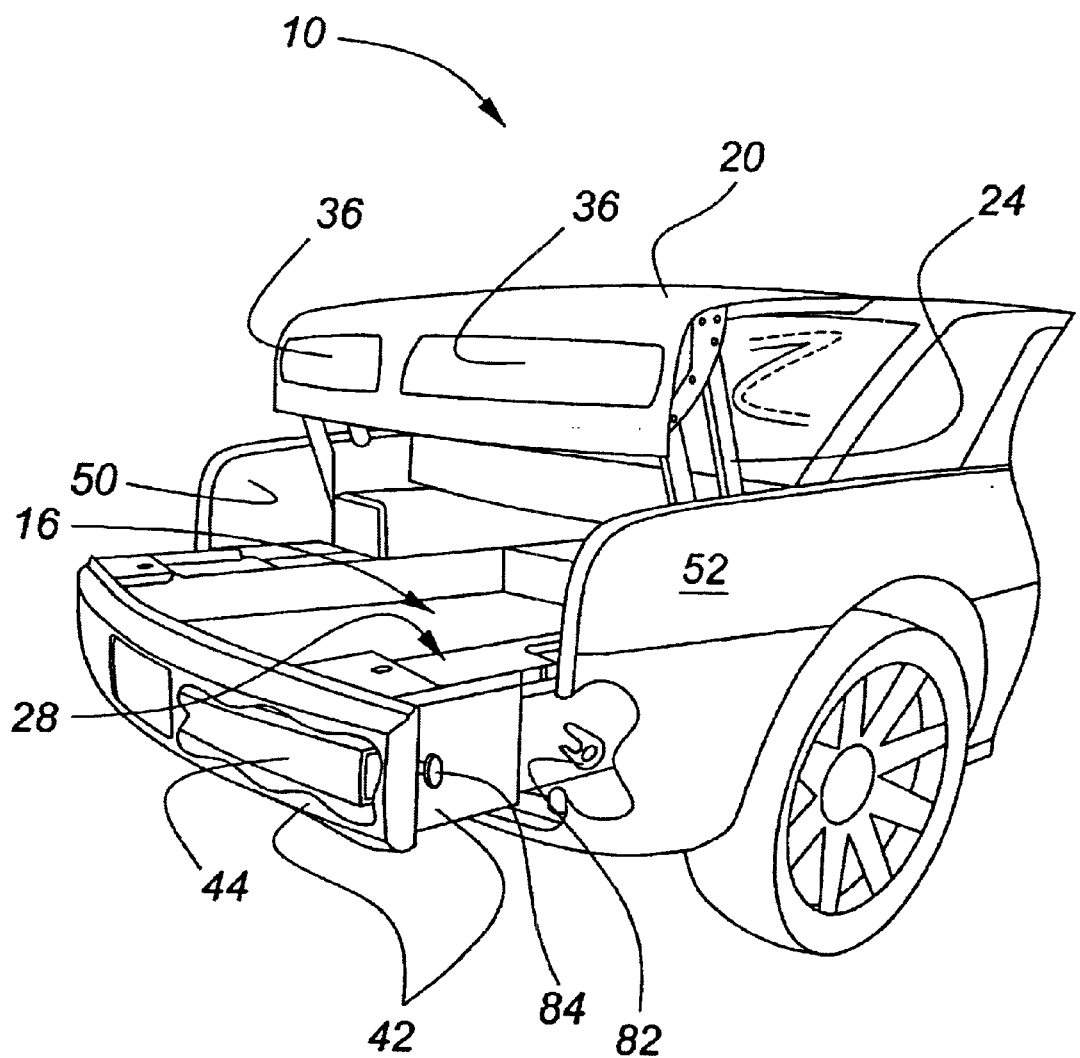
FIG. 1 is a perspective view of a vehicle having a decklid and luggage compartment system according to the present invention, shown in an open position.
Figure 1A:
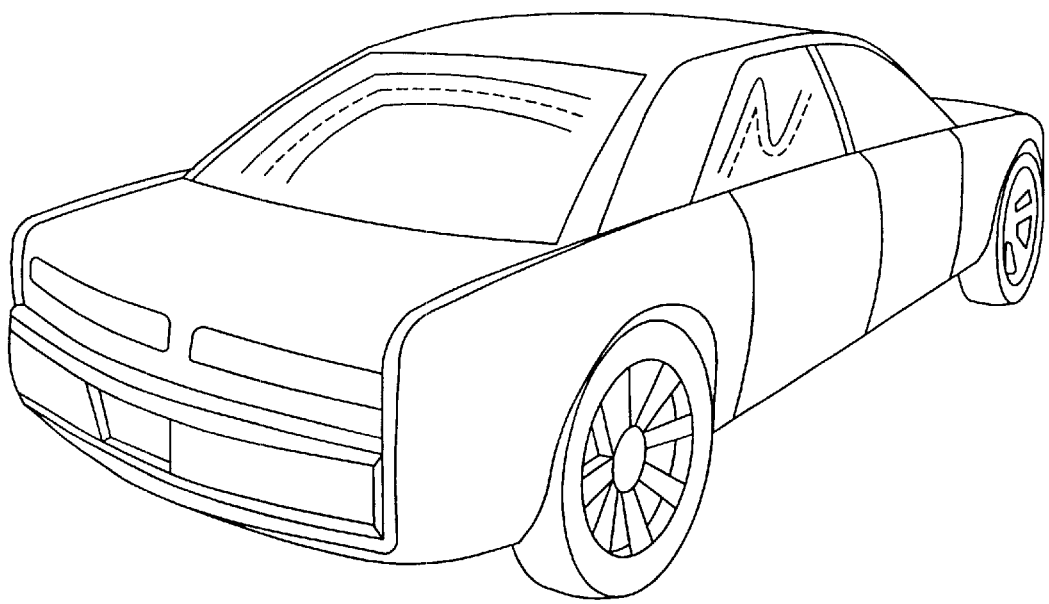
FIG. 1a is a perspective view which is similar to FIG. 1, but which shows the present decklid and luggage compartment system in a closed position.

As shown in FIGS. 1 and 1a vehicle 10 has a rear luggage compartment 16 with a decklid 20. Linked hinge 24 (FIG. 1) moves decklid 20 translationally from a closed position to an opened position. This movement is described as being "translational" because linked hinge 24 is a four-bar link, and decklid 20 does not rotate as it is moved from its closed position to its opened position, and vice versa. Because of this translational motion, the attitude of decklid 20 does not change as it is moved to and from the various positions. As used herein, the term "attitude" means, in accord with its classic definition, the orientation of a body in three dimensional space. Because the attitude of decklid 20 does not change, taillights 36, which are incorporated in decklid 20, remain in a constant visual orientation. In other words, the visual orientation of tail lights 36 is preserved both during and after opening and/or closing of decklid 20, so that the taillights are easily viewed.

The present decklid and luggage compartment also includes movable load floor 28 for luggage compartment 16. Load floor 28 is mounted upon a sliding carrier to permit movement between its extended position and its retracted position. FIG. 1 thus shows load floor 28 in its extended position. FIG. 1 also shows fascia 42 which extends both laterally across bumper beam 44, which is enclosed by fascia 42, and also axially around a portion of load floor 28.

When movable load floor 28 is in its closed position, bumper beam 44 is latched to left quarter SO and right quarter 52 of vehicle 10. This latching is accomplished by means of striker stud 84 and latches 82, with left and right striker studs 84 being incorporated into movable load floor 28, and left and right latches 82 being incorporated in left quarter 50 and right quarter 52. Although latches 82 are shown as being of a trapper type design, those skilled in the art will appreciate in view of this disclosure the other types of latches could be employed according to the present invention, so as to secure bumper beam 44 to the quarters 50 and 52 when load floor 28 is in its closed position. Latches 82 may be operated by cable release mechanisms or solenoids known to those skilled in the art and suggested by this disclosure, or by other types of mechanisms known to those skilled in the art and suggested by this disclosure.

Figure 2:
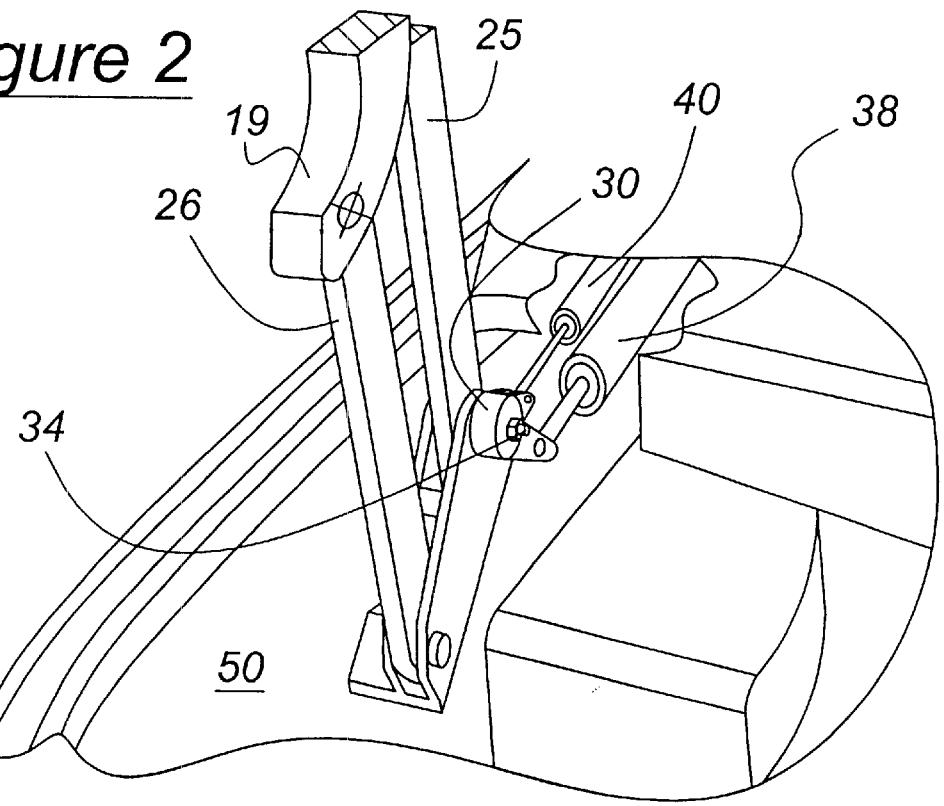
FIG. 2 is a perspective view of a portion of the vehicle of FIG. 1 showing with particularity the linked hinge system for attaching and translationally moving the vehicle's decklid.

FIG. 2 illustrates details of a linked hinge system suitable for use with a decklid according to the present invention. Decklid hinge 24 comprises drive bar 25, and idler bar 26, which are hinged at one end to the vehicle's structure in the vicinity of a wheelhouse, and hinged at a second end to bracket 19, which is attached to decklid 20. Drive bar 25 is keyed to pivot shaft 34, as is pitman arm 30. Pitman arm 30 is rotated by means of hydraulic cylinder 38, which is powered by a hydraulic pump (not shown). As pitman arm 30 rotates, it rotates drive bar 25, which then moves decklid 20 to the desired position. The precise position of decklid 20 is indicated by LVDT 40. As used here, the term "LVDT" means linear variable differential transformer, which is a position sensing device.

Those skilled in the art will appreciate in view of this disclosure that other types of sensing devices such as Hall Effect sensors or linear or rotational potentiometers, or other devices such as limit switches may be used to determine the position of a decklid according to the present invention. It is important that a four-bar link or other type of non-trivial hinge device be used to maintain the decklid in a relatively constant orientation as it is moved from its closed position to its opened position, so as to preserve the visual orientation of tail lights 36, while at the same time providing maximum accessibility to the luggage compartment for loading and unloading.

Figure 3:
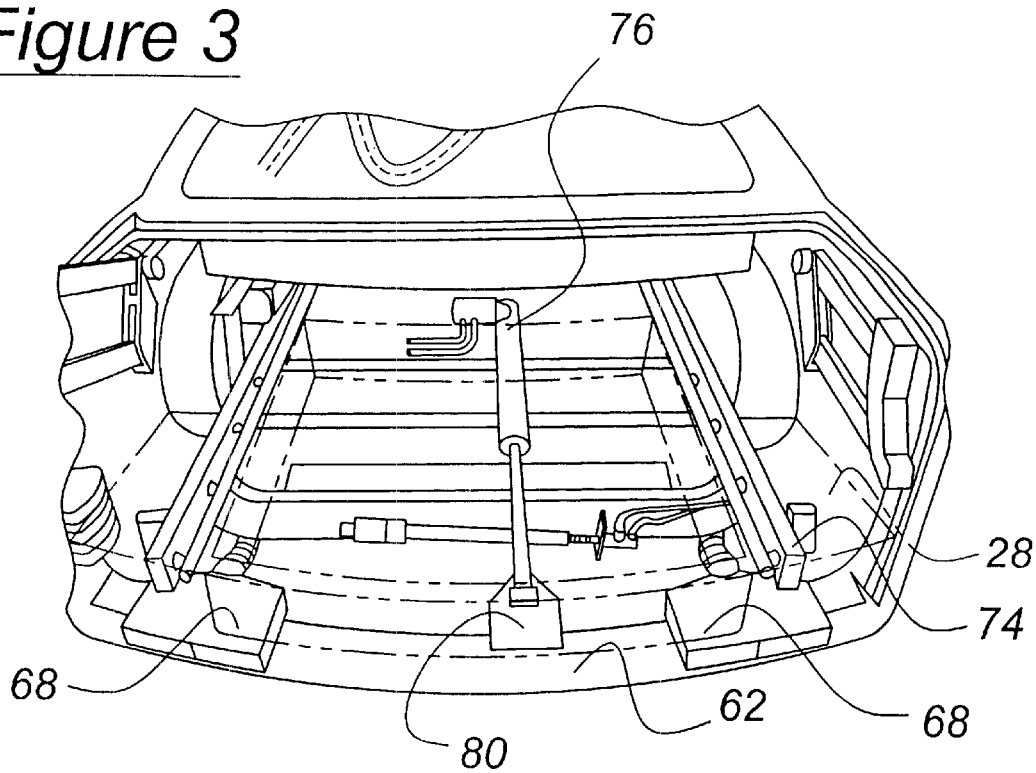
FIG. 3 is a rear view of the vehicle having a decklid and luggage compartment system according to the present invention, showing a portion of the present invention.
Figure 4:
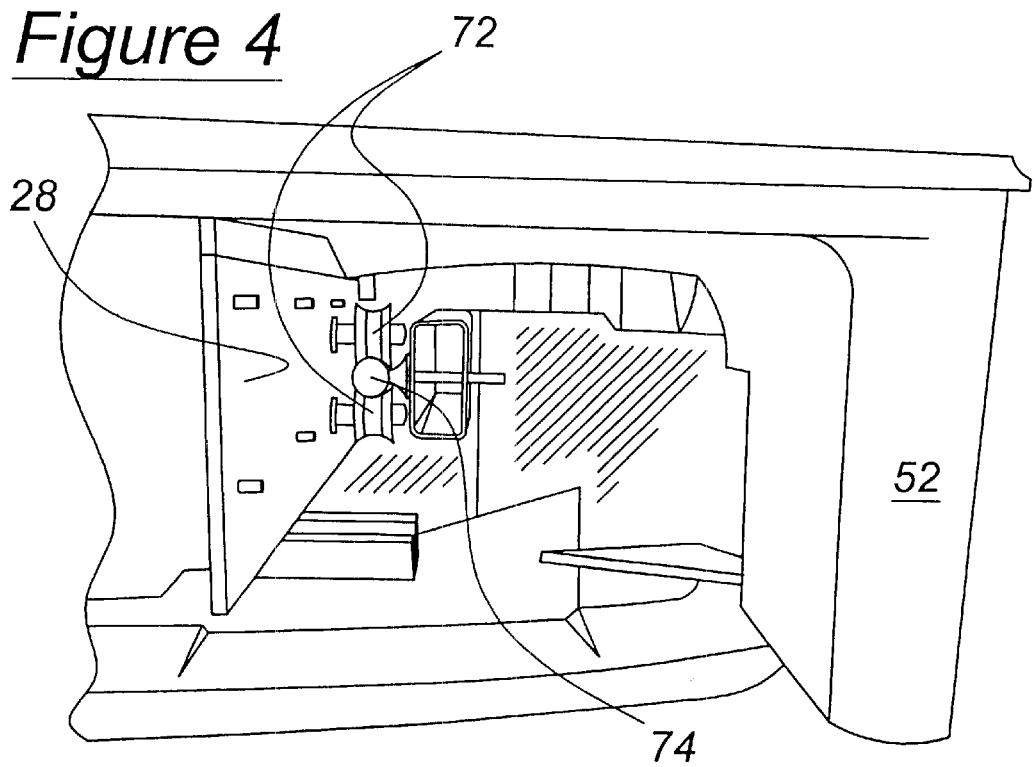
FIG. 4 is a rear view of a portion of a vehicle showing details of a movable load floor support according to one aspect of the present invention.

FIGS. 3 and 4 illustrate additional details of construction of movable load floor 28. Movable load floor 28 is mounted upon left and right support rails 74 by means of rollers 72 (FIG. 4). Rollers 72 are mounted to the structures of movable load floor 28, and support rails 74 are mounted rigidly to the body of vehicle 10. As shown in FIG. 3, load floor 28 is moved between its retracted and extended positions by means of hydraulic motor 76. Those skilled in the art will appreciate in view of this disclosure that other types of motor drives, such as electrically or hydraulically operated ball screws, or pneumatic cylinders, other yet devices known to those skilled in the art may be employed to motorize load floor 28. For example, FIG. 5 shows an electric motor 102 driving a screw 104 to power load floor 28.

As shown in FIG. 3, the present decklid and luggage compartment system may optionally include lower valance panel 62, having exhaust outlets 68 incorporated therein. If this option is chosen, fascia 42 and bumper 44 will close to a position in which they are superimposed over lower valance panel 62 and exhaust outlets 68.

The present decklid and luggage compartment system may be employed according to the present method by first translationally opening decklid 20 by means of hydraulic cylinder 38. Once decklid 20 is in its fully opened position, combination bumper and luggage compartment load floor 28 will be moved from its axially retracted position to its extended position by means of hydraulic cylinder 76, which is attached to load floor 28 via tab 80 (FIG. 3). This will allow luggage items to be placed upon extended load floor 28. Then, load floor 28 may be returned to its retracted position by hydraulic cylinder 76, and then the decklid 20 may be translationally closed while at the same time keeping the visual orientation of taillights 36 at a constant. Finally, latches 82 may be closed, either at the precise moment strikers 84 enter latches 82, or afterwards by means of a cable system or solenoid or other types of closing device known to those skilled in the art and suggested by this disclosure.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. A decklid and luggage compartment system for an automotive vehicle, comprising:
    a luggage compartment located at one end of an automotive vehicle;
    a decklid for closing said luggage compartment;
    a linked hinge for moving the decklid translationally from closed position to an opened position, with the decklid having a common attitude in both the closed and opened positions; and
    a movable load floor for said luggage compartment, with said load floor being mounted upon a sliding carrier for movement between an extended position and a retracted position.

2. A decklid and luggage compartment system according to claim 1, wherein said decklid further comprises at least one taillight.

3. A decklid and luggage compartment system according to claim 1, wherein said load floor further comprises a bumper.

4. A decklid and luggage compartment system according to claim 3, wherein said bumper comprises a laterally extending bumper beam with a fascia which extends both laterally and axially around a portion of the load floor.

5. A decklid and luggage compartment system according to claim 3, wherein said bumper comprises a bumper beam and a latch system for selectively connecting the bumper beam with left and right quarter panel structures of the vehicle.

6. A decklid and luggage compartment system according to claim 1, further comprising a motor drive for operating said linked hinge of said decklid.

7. A decklid and luggage compartment system according to claim 1, wherein said linked hinge comprises a four bar hinge having a motor drive for rotating at least one of said bars to move said decklid.

8. A decklid and luggage compartment system according to claim 7, wherein said motor drive rotatably drives a pivot shaft upon which at least one of said bars to is mounted.

9. A decklid and luggage compartment system according to claim 7, wherein said motor drive comprises an electric motor.

10. A decklid and luggage compartment system according to claim 7, wherein said motor drive comprises a hydraulic motor.

11. A decklid and luggage compartment system according to claim 1, further comprising a motor drive for moving said load floor.

12. A decklid and luggage compartment system according to claim 11, wherein said motor drive comprises an electrically powered screw drive.

13. A decklid and luggage compartment system according to claim 11, wherein said motor drive comprises a hydraulic cylinder.

14. A decklid and luggage compartment system for an automotive vehicle, comprising:

a luggage compartment located at one end of an automotive vehicle;

a decklid for closing said luggage compartment;

a linked hinge for moving the decklid translationally from closed position to a raised and axially displaced opened position, with the decklid having a common attitude in both the closed and opened positions; and a combination load floor and bumper assembly having a load floor for said luggage compartment, with said load floor being mounted upon a sliding carrier for movement between an extended position and a retracted position, and with said combination load floor and bumper assembly having a bumper beam and latches for connecting the bumper beam to rear quarter panel structures of the vehicle when the load floor is in said retracted position.

15. A decklid and luggage compartment system for an automotive vehicle according to claim 14, further comprising a first motor drive for moving the decklid hinge and decklid, and a second motor drive for moving the load floor into its extended and retracted positions.

16. A decklid and luggage compartment system for an automotive vehicle according to claim 14, further comprising a lower valance panel located beneath the combination load floor and bumper assembly, with said lower valance panel having a plurality of exhaust outlets being located therein.

17. A method for loading a luggage compartment of an automotive vehicle, comprising the steps of:

translationally opening a decklid such that the attitude of the decklid remains relatively constant as the decklid is moved from a closed position to an opened position, so as to preserve the visual orientation of a plurality of taillights attached to the decklid;

opening a combination bumper and luggage compartment load floor, by moving the combination load floor axially from a retracted position to an extended position;

placing luggage items upon the extended load floor;

moving the combination load floor to its retracted position; and translationally closing the decklid such that the visual orientation of the taillights is preserved during and after closure of the decklid.

18. A method according to claim 17, further comprising the step of latching the combination bumper to adjoining body structures when the combination bumper is returned to its retracted position.

* * * * *